United States Patent
Brod et al.

(10) Patent No.: US 8,022,828 B2
(45) Date of Patent: Sep. 20, 2011

(54) DEVICE AND METHOD FOR READING AND/OR WRITING DATA FROM AND/OR TO A MULTIPLICITY OF RFID CHIPS

(75) Inventors: Volker Brod, Bad Abbach (DE); Henrik Bufe, Dresden (DE); Wolfram Kunze, Görlitz (DE)

(73) Assignee: Muehlbauer AG, Roding (DE)

( * ) Notice: Subject to any disclaimer, the term of this patent is extended or adjusted under 35 U.S.C. 154(b) by 747 days.

(21) Appl. No.: 11/921,599

(22) PCT Filed: May 19, 2006

(86) PCT No.: PCT/EP2006/062440
§ 371 (c)(1),
(2), (4) Date: Jun. 23, 2008

(87) PCT Pub. No.: WO2006/131439
PCT Pub. Date: Dec. 14, 2006

(65) Prior Publication Data
US 2008/0266105 A1 Oct. 30, 2008

(30) Foreign Application Priority Data

Jun. 6, 2005 (DE) .......................... 10 2005 026 183
Jul. 30, 2005 (DE) .......................... 10 2005 035 848

(51) Int. Cl.
*G08B 13/14* (2006.01)

(52) U.S. Cl. ................................................... 340/572.7

(58) Field of Classification Search .... 340/572.1–572.9; 343/793
See application file for complete search history.

(56) References Cited

U.S. PATENT DOCUMENTS

| | | | | |
|---|---|---|---|---|
| 4,916,457 A | * | 4/1990 | Foy et al. | 343/770 |
| 5,280,286 A | * | 1/1994 | Williamson | 342/44 |
| 5,880,695 A | | 3/1999 | Brown et al. | 343/700 |
| 5,892,486 A | * | 4/1999 | Cook et al. | 343/795 |
| 7,460,078 B2 | * | 12/2008 | King et al. | 343/767 |
| 2002/0081180 A1 | | 6/2002 | Berndtsson | 414/333 |

FOREIGN PATENT DOCUMENTS

| | | |
|---|---|---|
| EP | 1429371 | 6/2004 |
| WO | WO 2004/072892 | 8/2004 |

* cited by examiner

*Primary Examiner* — Phung Nguyen
(74) *Attorney, Agent, or Firm* — John A. Miller; Miller IP Group, PLC

(57) ABSTRACT

The invention relates to a device and a method for reading and/or writing data from and/or to a multiplicity of RFID chips arranged in smart labels within a smart label production device, wherein the smart labels each comprising a first antenna are applied next to and behind one another on a common continuous film-like strip, wherein each smart label from a selected set of smart labels arranged next to and/or behind one another is respectively assigned a second antenna for the simultaneous transmission of read and/or write data between the first and second antennas by means of ultrahigh frequency waves, wherein the second antennas are arranged in a planar manner within at least one common antenna carrier.

14 Claims, 6 Drawing Sheets

DEVICE AND METHOD FOR READING AND/OR WRITING DATA FROM AND/OR TO A MULTIPLICITY OF RFID CHIPS

CROSS REFERENCE TO RELATED APPLICATIONS

The present application is a National Phase Application of International Application No. PCT/EP2006/062440, filed May 19, 2006, which claims priority to German Patent Application No. 10 2005 026 183.3, filed Jun. 6, 2005, and German Patent Application No. 10 2005035 848.9 filed Jul. 30, 2005, which applications are incorporated herein fully by this reference.

BACKGROUND OF THE INVENTION

The invention relates to a device and a method for reading and/or writing data from and/or to a multiplicity of RFID chips arranged in smart labels within a smart label production device, according to the preambles of claims 1 and 10, wherein the smart labels are applied next to and behind one another on a common continuous film-like strip.

In smart label production devices, several thousand smart labels are produced continuously every hour. Such smart labels usually consist of an antenna and an associated RFID (radio frequency identification) chip, and are arranged both behind one another and next to one another at small spacings on a common web which is a continuous strip of a plastic film, a paper or the like.

In order to initialise such RFID chips which are arranged in the smart labels, together with writing to and reading from the RFID chips an individual ID number and also further data, it is necessary for the unambiguous allocation of the ID (identification) number to a specific smart label to write to and read from a selected smart label independently of the adjacent smart labels and without influencing the latter. This usually takes place by means of high-frequency wave transmission from an antenna arranged in the device to the antenna of the smart label.

Furthermore, targeted selection of a specific smart label without any influencing by adjacent smart labels is also necessary in order to subsequently carry out a functional test of the smart label. To date, this has required the individual actuation of individual smart labels by means of the antenna which transmits write and/or read data and also an associated write and/or read element, which, due to the long initialisation times of several seconds per smart label which represents one programming operation, results in a reduction in throughput of the production installation as a whole, since more smart labels can be produced than can subsequently be initialised and tested.

Accordingly, the object of the present invention is to provide a device for reading and/or writing data from and/or to a multiplicity of RFID chips arranged in smart labels within a smart label production device, which reduces or prevents any reduction in the maximum possible throughput of the device as a whole caused by the necessary initialisation and testing operation and the associated (communication) times, said maximum possible throughput being defined by the production steps of the production device.

SUMMARY OF THE INVENTION

This object is achieved in terms of the device by the features of claim 1 and in terms of the method by the features of claim 10.

According to a core concept of the invention, in a device for reading and/or writing data from and/or to a multiplicity of RFID chips arranged in smart labels within a smart label production device, wherein the smart labels are applied next to and behind one another on a common continuous film-like strip, each smart label from a selected set of smart labels arranged next to and/or behind one another is respectively assigned a second antenna (tester antenna) for the simultaneous transmission of read and/or write data between the first and second antennas by means of ultrahigh frequency waves, wherein the second antennas (tester antennas) are arranged in a planar manner within at least one common antenna carrier.

Ideally, each second antenna (tester antenna) is preferably arranged with its entire antenna body and an associated read and/or write element within a depression of the antenna carrier, which is of flat design on its surface facing towards the strip. As a result, there is both a spatial separation and a shielding of the second antennas, which are designed as tester antennas and initialisation antennas, from their adjacent second antennas and from the first antennas to be tested. This results in an optimal isolation of the individual second antennas (tester antennas) and optionally of the individual read and/or write elements which are connected to the second antennas. This leads to a reduced influencing of adjacent smart labels and to a reduced influencing by the adjacent smart labels during the initialisation and testing of the selected smart label.

The throughput of the production device as a whole can be increased by such a parallel initialisation and testing procedure for the selected set of smart labels arranged on the strip.

The read and/or write elements are so-called RFID readers, which are connected by means of coaxial cables to the tester antennas respectively assigned to them within the antenna carrier.

In order to obtain the least possible influencing of adjacent tester antennas and of the smart labels assigned thereto during an initialisation and/or test procedure, besides the spatial separation and shielding obtained by the depressions it is also possible to use different operating or transmission frequencies between adjacent smart labels and the write and/or read elements assigned thereto. The frequency bands released for RFID technology in the various countries are suitable for this. By way of example, depending on the country, this frequency range may lie between 865 and 965 MHz. As a result, it is possible to process each RFID chip at its own operating frequency. By means of a frequency-selective input circuit of the write and read elements, the effect of adjacent transmission frequencies is considerably reduced or filtered. As a result, mutual influencing can be avoided as far as possible while simultaneously processing adjacent smart labels.

Furthermore, besides the different operating frequency and the spatial separation, a different polarisation and emission characteristic of the electromagnetic waves of such adjacent second antennas (tester antennas) may. be used in order to further reduce the risk of mutual influencing. To this end, it is conceivable for example to use a left-handed circular polarisation (LHCP) and a right-handed circular polarisation (RHCP) of electromagnetic waves which are emitted from different adjacent read and/or write elements with their associated second antennas. This makes it possible to improve the power factor by approx. 10-15 dB.

By using these three distinguishing variables between adjacent smart labels to be initialised and tested, namely different operating frequencies, different polarisations and different depressions within the antenna carrier, attenuation values of 30-40 dB (1:1000-1:10,000) are achieved between the individual test systems with respect to the width of a smart label.

A distance between the surface of the antenna carrier and the second antenna inserted in the depression is preferably adjustable, as is a rotation angle of a rotation of the second antenna which can be carried out about an axis of rotation perpendicular to the surface. This results in an optimised alignment of the second antennas relative to the first antennas which are arranged in the smart labels. An optimised transmission of the read and/or write data from the read and/or write elements via the second antennas and the first antennas to the RFID chips of the smart labels is thus obtained.

Preferably, air holes for exerting suction on the strip, which preferably lies above the flat antenna carrier, are arranged in the depression-free regions of the surface of the antenna carrier, in order to obtain, during the transmission of the read and/or write data, an optimised alignment of the first and second antennas and also a spatial delimitation of the system "depression—second antenna arranged therein—first antenna located directly above—RFID chip".

According to one preferred embodiment, the surface of the antenna carrier is at least partially made of metal, so that any induced eddies that form can be dissipated via the ground potential that can be generated by the metal surface. To this end, the surface is preferably made of a highly conductive metal, such as copper.

Walls, such as those of the depressions, may also be made of such material. The entire metal structure of the antenna carrier thus represents the ground potential of any coaxial cables connected to the second antennas. In the optimal case, all seams between the depressions and the metal surface are peripherally sealed with metal so as to be impermeable to high frequencies.

According to one preferred embodiment, the second antennas have two intersecting double dipoles which may be designed as microstripes. This configuration of the antennas allows a sharply delimited emission of the electromagnetic waves in the direction of the smart label under analysis. This special antenna layout may be used for example for a frequency range around 900 MHz.

The electromagnetic waves emitted from such antennas have a right-handed or left-handed circular polarisation. An adaptation of any coaxial cables that are present has been selected in such a way that a real input resistance of 50 Q is obtained at the desired operating frequencies.

Advantageously, two or more antenna carriers are arranged within one plane, preferably below the strip, said antenna carriers being able to be displaced in both the longitudinal and transverse direction of the strip in order to allow precise allocation to the smart labels to be checked.

A method for reading and/or writing data from and/or to a multiplicity of RFID chips arranged in smart labels within a smart label production device is characterised by the simultaneous transmission of the read and/or write data by means of different read and/or write elements which, like the second antennas assigned thereto, are arranged directly adjacent to one another, at different frequencies and polarisations and spatial separations and without giving rise to mutual influencing.

Further advantageous embodiments emerge from the dependent claims.

BRIEF DESCRIPTION OF THE DRAWINGS

Advantages and expedient features can be found in the following description in conjunction with the drawing, in which.

DETAILED DESCRIPTION OF THE INVENTION

Figure 1:
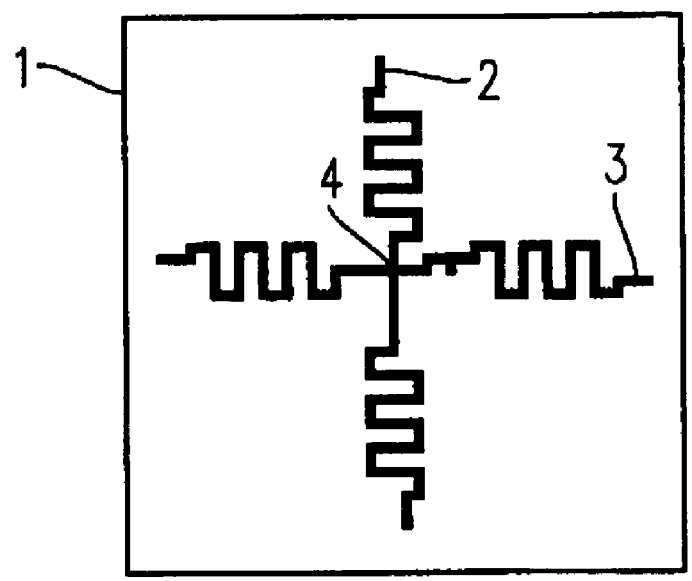
FIG. 1 schematically shows a plan view of a double dipole antenna for use in a device of the invention according to one embodiment of the invention.
Figure 1:
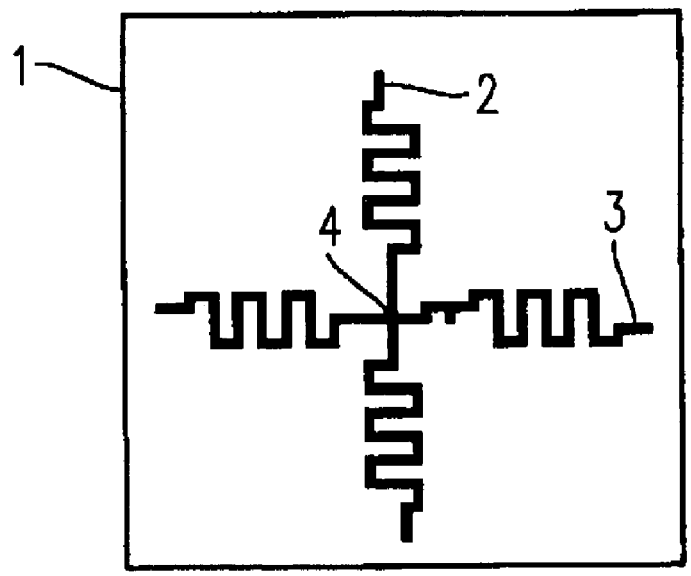

FIG. 1 shows in the left-hand diagram an intersecting dipole antenna for a right-handed circular polarisation and in the right-hand diagram an intersecting double dipole antenna for generating a left-handed circular polarisation.

The two double dipole antennas are characterised by different dimensions, as shown by the dimensional units.

The two dipole antennas 2, 3 are arranged on a small board element 1 in such a way that they intersect at a central point 4.

Figure 2:
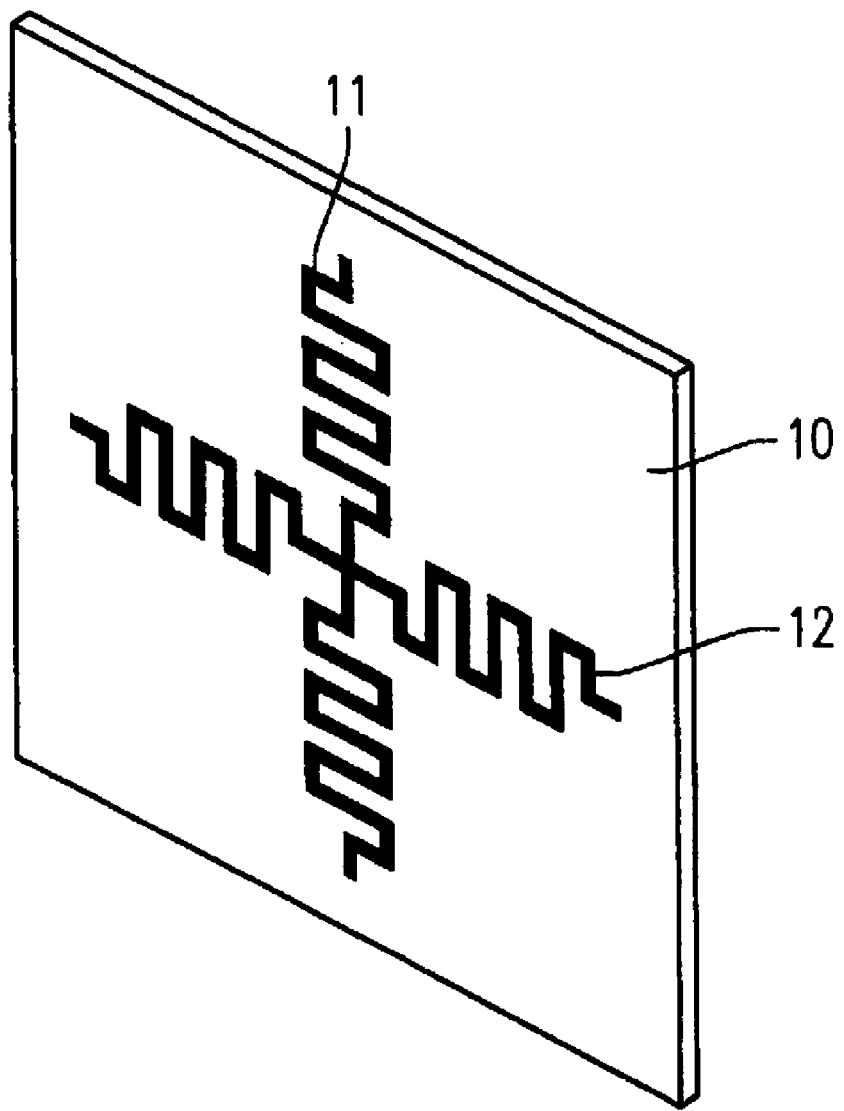
FIG. 2 shows a perspective view of a double dipole antenna for use in a device of the invention.

FIG. 2 shows in a perspective view the double dipole antenna as can be used for the device according to the invention. Once again, two double dipoles 11, 12 which are for example printed onto a board element 10 run on said board element at right angles to one another in such a way that they intersect in the centre of the illustrated square of the board element 10.

Figure 3:
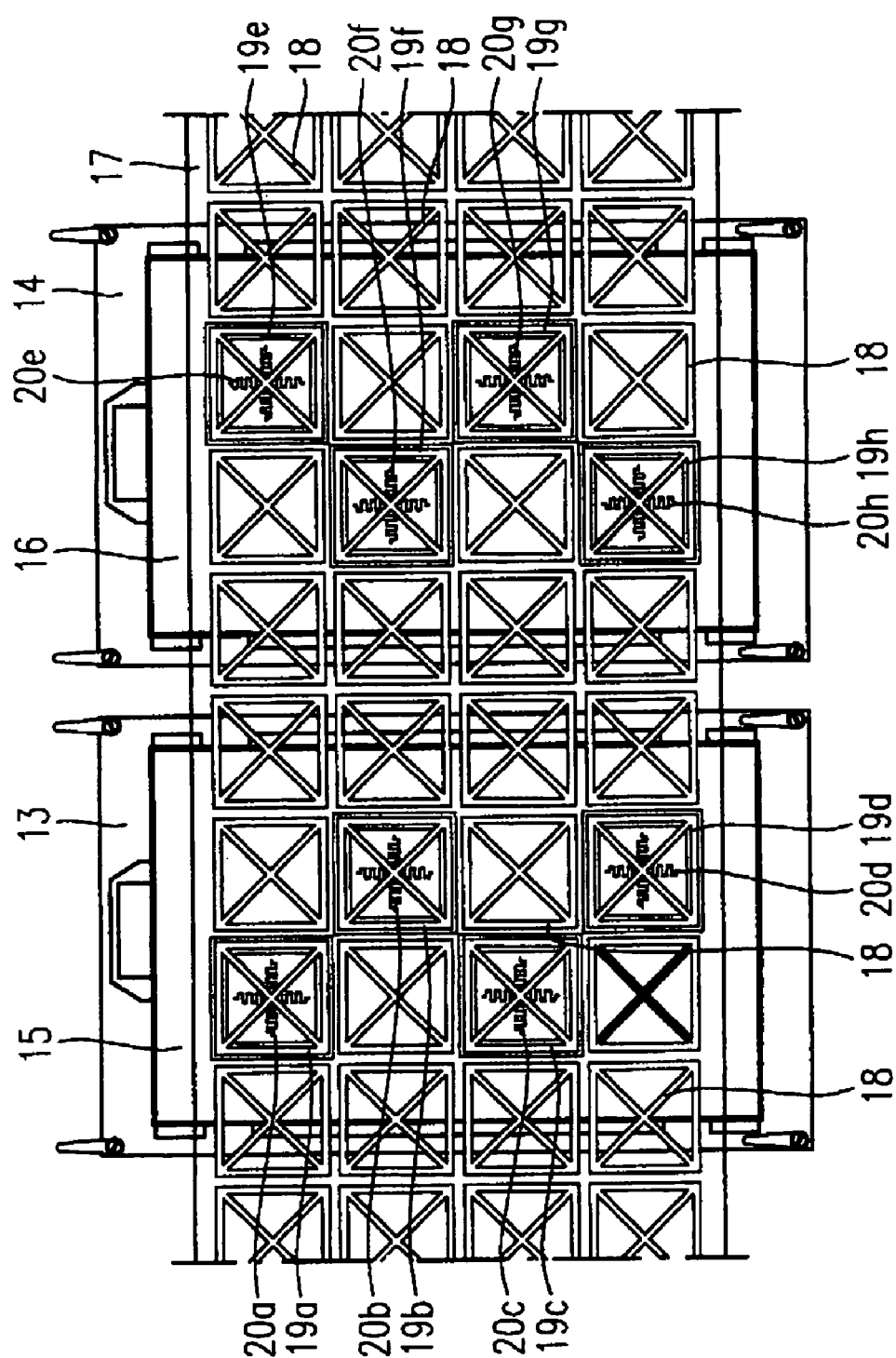
FIG. 3 schematically shows in plan view the device of the invention according to one embodiment of the invention.

FIG. 3 shows in a plan view the device of the invention according to one embodiment of the invention. It can be seen from this diagram that each antenna carrier is composed of a base frame 11, 14 and of a shielding plate 15, 16 placed thereon. Running over both the antenna carriers is a film-like strip 17, on which a multiplicity of smart labels 18, 19a-h are arranged close to one another.

Figure 4:
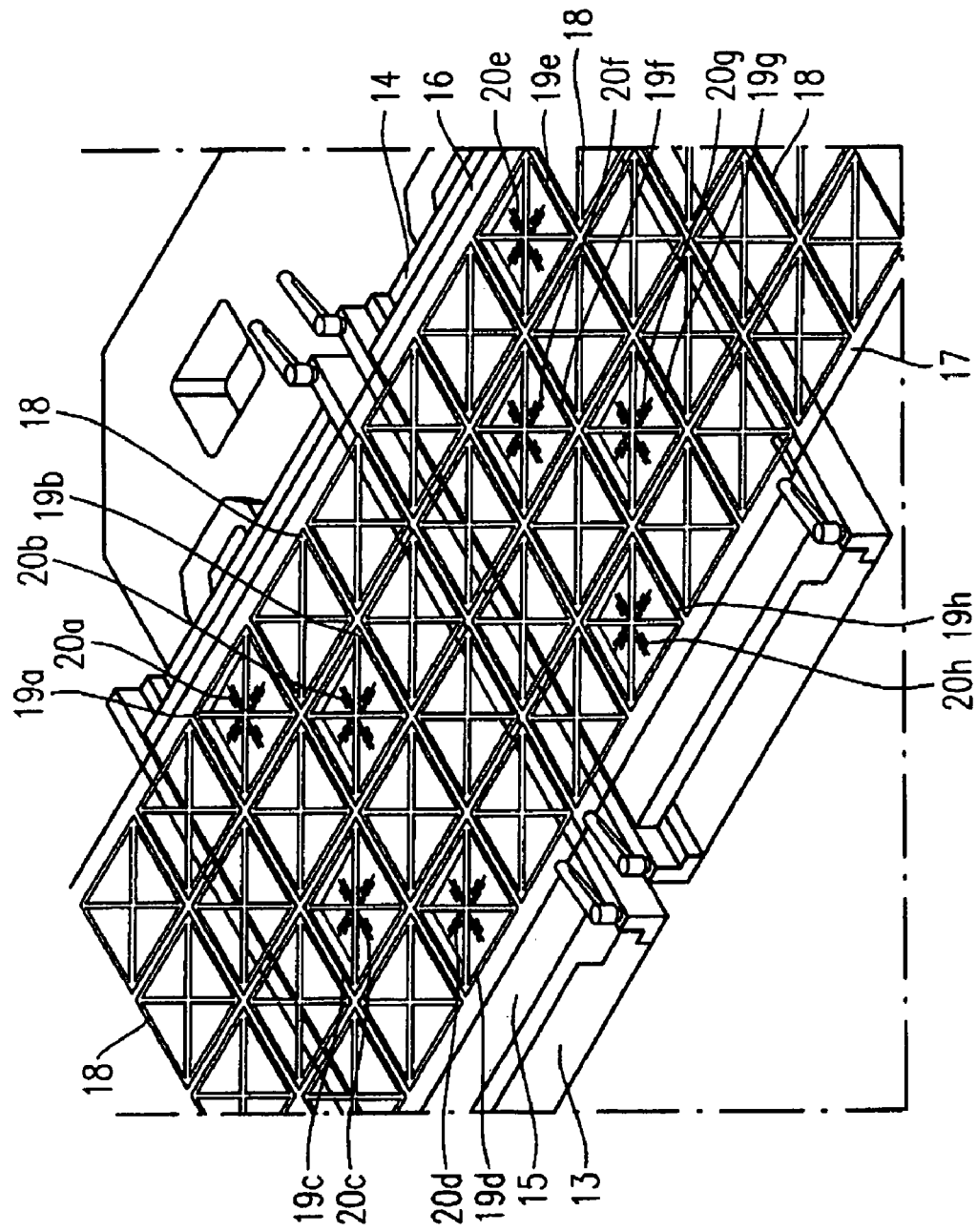
FIG. 4 shows in a perspective view the device of the invention according to the embodiment of the invention.

The smart labels 19a-19h are arranged above second antennas 20a, 20h which, as can be seen from FIG. 4, are placed within depressions in the shielding plates 15, 16. This results in a spatial separation and electromagnetic isolation of these second antennas with read and/or write elements (not shown here) arranged therebelow.

Figure 5:
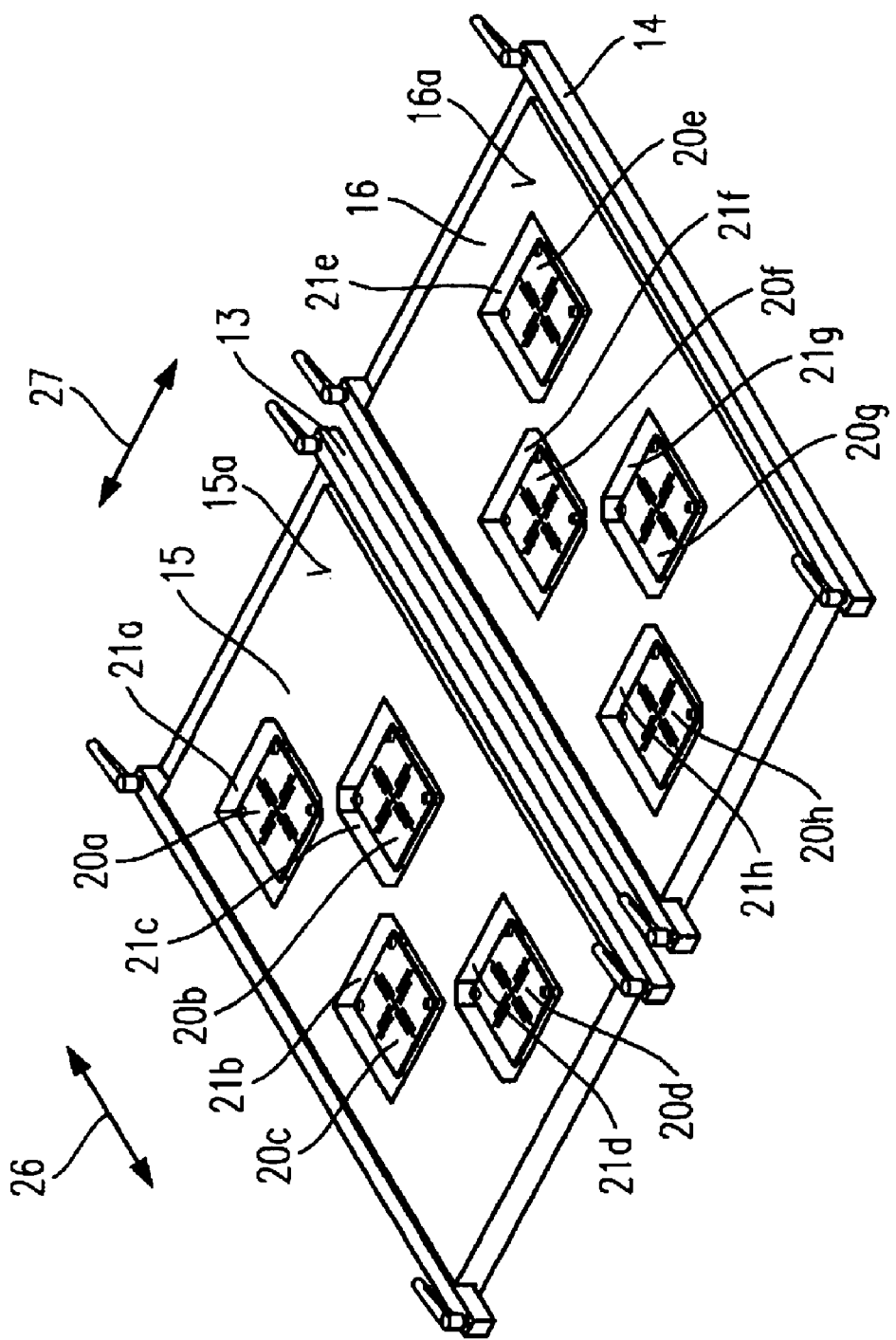
FIG. 5 shows in a perspective view the device of the invention according to the embodiment of the invention without a strip comprising smart labels located thereabove.

The depressions 21a-21d and 21e-21h can clearly be seen in the perspective view of the device according to the invention which is shown in FIG. 5 without the strip running over it. Preferably, such depressions have a depth which makes it possible for the entire antenna bodies of the second antennas to be accommodated in this depression such that they do not protrude from the top thereof.

The second antennas, which serve as testing and initialisation antennas, have an emission characteristic which allows transmission of the data within a near field in an optimised manner. In principle, in the case of two adjacent antennas, use may be made of an emission of electromagnetic waves with different polarisations, such as for example a combination of circular and linear polarisations. This makes it possible to reduce the influencing by adjacent antennas.

As shown by the double arrows 26, 27, the antenna carriers can be displaced in both the longitudinal and width direction of the strip running thereabove, in order to achieve an optimised alignment of the test antennas 20a-h relative to the antennas or smart labels 19a-h to be tested.

Figure 6:
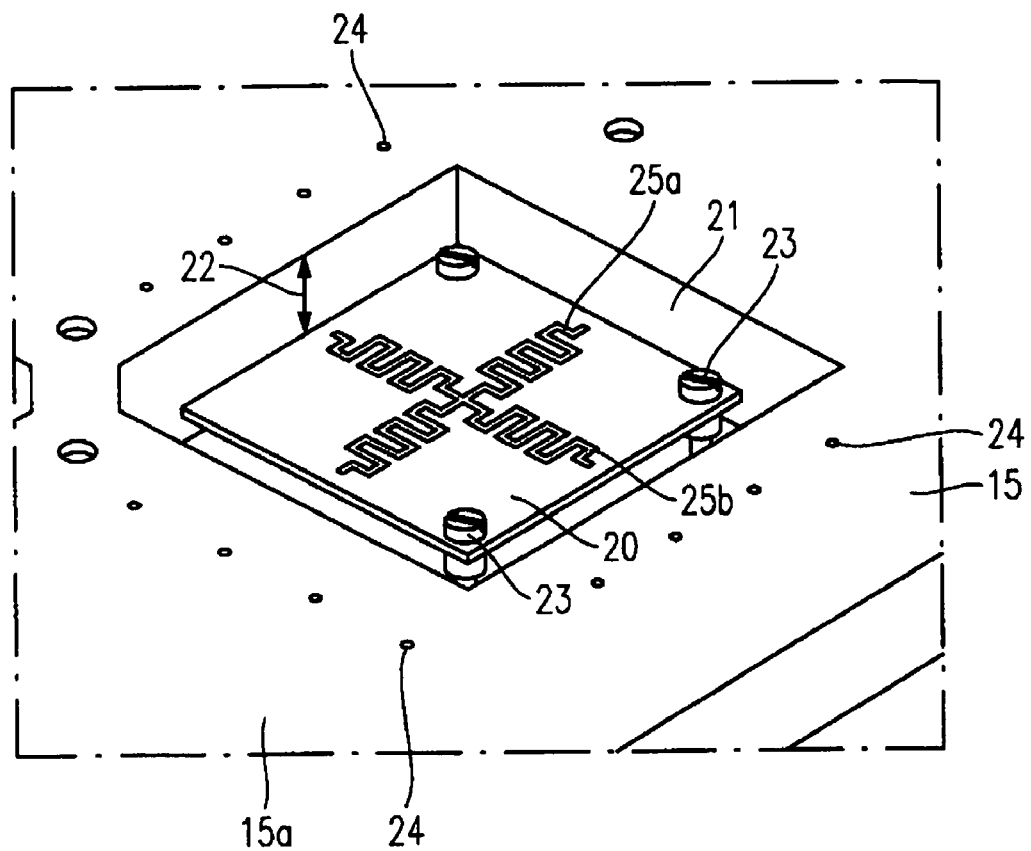
FIG. 6 shows in an enlarged view the device of the invention according to the embodiment of the invention.

FIG. 6 shows in an enlarged perspective view a depression 21 with the second antenna 20 arranged therein, said second antenna having two double dipoles 25a and 25b. The depression 21 ideally has shaft-like walls in order to optimise a spatial separation from adjacent second antennas. The antenna 20 arranged in the depression 21 can be varied in terms of its distance from the surface of the shielding plate 15 by means of the screws 23, as shown by the double arrow 22.

Air holes 24 are arranged around the depression 21 on the surface of the shielding plate 15, in order to exert suction by means of negative pressure on the film parts of the strip 17 adjacent to the depression during the initialisation and test phase.

All the features disclosed in the application documents are claimed as essential to the invention in so far as they are novel individually or in combination with respect to the prior art.

LIST OF REFERENCES 1, 10 base plate
2, 3, 11, 12, 25a, 25b double dipoles
4 point of intersection
13, 14 base frame of the antenna carrier
15, 16 shielding plates of the antenna carrier
17 strip
18, 19a-19h smart labels
20a, 20h second antennas
21a, 21h depressions
22 height adjustment of the antennas
23 fixing screws of the antennas
24 air holes
26, 27 directions of displacement of the antenna carriers

The invention claimed is:

1. A device for reading and/or writing data from and/or to a multiplicity of RFID chips arranged in smart labels within a smart label production device, wherein the smart labels each comprising a first antenna are applied next to and behind one another on a common continuous film-like strip, characterised in that each smart label from a selected set of smart labels arranged next to and/or behind one another is respectively assigned a second antenna for the simultaneous transmissions of read and/or write data between the first and second antennas by means of ultrahigh frequency waves, wherein the second antennas are arranged in a planar manner within at least one common antenna carrier, wherein each second antenna is arranged with its entire antenna body and in each case an associated read and/or write element within a depression of the antenna carrier, which is of flat design on its surface facing towards the strip.

2. The device according to claim 1, characterised in that a distance between the surface and the second antenna inserted in the depression is adjustable and/or a rotation angle of a rotation of the second antenna, which can be carried out about an axis of rotation perpendicular to the surface, is adjustable.

3. The device according to claim 1, characterised in that air holes for sucking the strip against the surface during the transmission of the read and/or write data are arranged in depression-free regions of the surface of the antenna carrier.

4. The device according to claim 1, characterised in that the surface is at least partially made of metal.

5. The device according to claim 1, characterised in that the second antennas arranged on the at least one common antenna carrier have different UH transmission frequencies.

6. The device according to claim 1, characterised in that two second antennas arranged adjacent to one another on the at least one common antenna carrier emit differently polarised electromagnetic waves.

7. The device according to claim 1, characterised in that one or more second antennas is/are designed as two intersecting double dipoles.

8. The device according to claim 1, characterised by a second antenna carrier which can be displaced in the longitudinal and transverse direction of the base with respect to a first antenna carrier.

9. A method for reading and/or writing data from and/or to a multiplicity of RFID chips arranged in smart labels within a smart label production device, wherein the smart labels each comprising a first antenna are applied next to and behind one another on a common continuous film-like strip, characterised in that each smart label from a selected set of smart labels arranged next to and/or behind one another is respectively assigned a second antenna for simultaneously transmitting read and/or write data between the first and second antennas by means of ultrahigh frequency waves, wherein the second antennas are arranged in a planar manner within at least one common antenna carrier and each second antenna is arranged with its entire antenna body and in each case an associated read and/or write element within a depression of the antenna carrier, which is of flat design on its surface facing towards the strip.

10. The method according to claim 9, characterised in that the second antennas transmit the data at different UH transmission frequencies.

11. The method according to claim 9, characterised in the two adjacent second antennas emit electromagnetic waves with different polarisation.

12. The method according to claim 9, characterised in that a distance between a surface of the flat antenna carrier and the second antennas inserted within depressions of the antenna carrier is adjusted.

13. The method according to claim 9, characterised in that the reading and/or writing of the data represents an initialisation of the RFID chip.

14. The method according to claim 9, characterised in that the reading of the data represents a method for testing the RFID chips.

* * * * *